Figure 1:
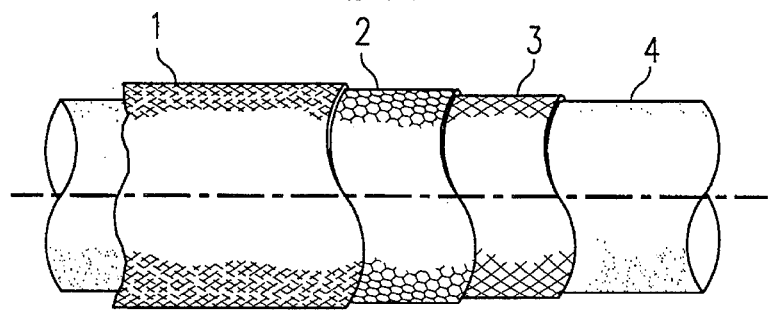

United States Patent [19]

Viellard

[11] Patent Number: 5,487,806
[45] Date of Patent: Jan. 30, 1996

[54] METHOD FOR EMBODYING A FLEXIBLE TUBULAR ELEMENT IMPREGNATED WITH RESIN TO BE SUBSEQUENTLY MOULDED

[76] Inventor: Paul-Henri Viellard, 22 rue Spontini, F75116 Paris, France

[21] Appl. No.: 77,899

[22] Filed: Jun. 18, 1993

Related U.S. Application Data

[63] Continuation-in-part of Ser. No. 762,528, Aug. 8, 1991, abandoned.

[30] Foreign Application Priority Data

| Aug. 8, 1990 | [FR] | France | 90 10108 |
| Dec. 5, 1990 | [FR] | France | 90 15225 |
| Dec. 5, 1990 | [FR] | France | 90 15226 |
| Jan. 21, 1991 | [FR] | France | 91 00609 |

[51] Int. Cl.$^6$ .................... A63B 49/10; B65H 81/00
[52] U.S. Cl. .................... 156/175; 156/156; 156/169; 156/173; 273/73 F
[58] Field of Search .................... 156/156, 173, 156/169, 171, 175, 86; 273/73 F, 80 B, 80 R; 264/136, 280

[56] References Cited

U.S. PATENT DOCUMENTS

| 3,902,944 | 9/1975 | Ashton et al. | 156/156 |
| 3,993,308 | 11/1976 | Jenks | 273/73 F |
| 3,998,458 | 12/1976 | Inoue et al. | 273/80 R |
| 4,023,799 | 5/1977 | Van Auken | 273/73 F |
| 4,157,181 | 6/1979 | Cecka | 273/80 R |
| 4,385,952 | 5/1983 | Futakuchi et al. | 156/174 |
| 4,512,836 | 4/1985 | Tucci | 156/174 |
| 4,725,060 | 2/1988 | Iwanaga | 273/80 B X |
| 4,983,242 | 1/1991 | Reed | 156/172 |
| 5,088,735 | 2/1992 | Shigeton | 273/80 B |
| 5,114,145 | 5/1992 | Yamaguchi et al. | 273/73 F |
| 5,143,669 | 9/1992 | Mott | 273/73 F X |
| 5,242,720 | 9/1993 | Blake | 273/73 F X |

FOREIGN PATENT DOCUMENTS

| 52-66033 | 6/1977 | Japan | 273/73 F |
| 61-220828 | 10/1986 | Japan | 156/156 |
| 1262704 | 2/1972 | United Kingdom | 156/169 |

*Primary Examiner*—Jeff H. Aftergut

[57] ABSTRACT

According to this method windings of reinforcing fibers are impregnated with resin and are wound, along a given length, around a flexible sheath placed onto a rigid rotary-driven mandrel. At least one additional winding of said impregnated reinforcing fiber around the flexible sheath is wound over a different length and according to a different pitch.

5 Claims, 5 Drawing Sheets

METHOD FOR EMBODYING A FLEXIBLE TUBULAR ELEMENT IMPREGNATED WITH RESIN TO BE SUBSEQUENTLY MOULDED

This is a continuation-in-part application of my application Ser. No. 762 528 filed Aug. 8, 1991, now abandoned.

The present invention concerns a method to manufacture rectilinear tubular elements or preferably curved or circular and whose mechanical characteristics vary at all points there of such as a tennis racket, a bicycle wheel rim, the tube of a bicycle frame or fork, the handle of golf club, a fishing rod or the armature of a plane seat. It also concerns a method for manufacturing fabric laps, whose anisotrophy could be controlled, from complex composite wrappings made of glass, carbon, aramid or any other fiber first impregnated with coloured or neutral thermosetting resin and then wound around an inflatable sheath before being introduced into a mould. The purpose of this invention is to offer a specifically rapid low cost method since it can be used repeatedly from a filamentary winding-on machine with digital control.

Figure 2:
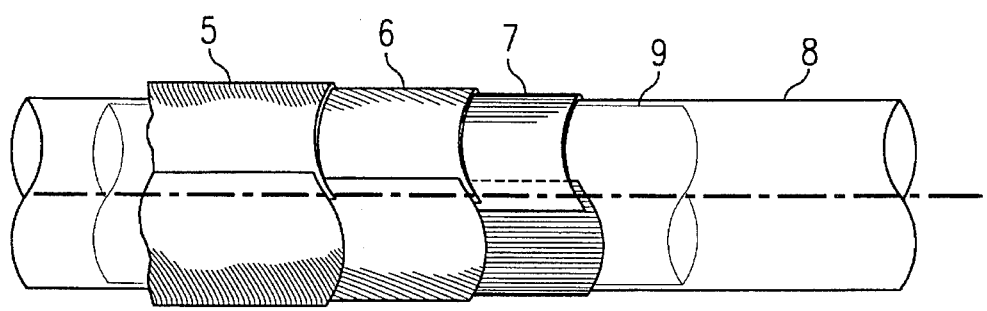

FIGS. 1 and 2 show the currently used methods for manufacturing composite fiber wrappings so as to subsequently embody tubular elements by means of moulding. Thus, FIG. 1 shows the traditional method to prepare by means of braiding several superimposed layers 1, 2, 3 of dry glass, carbon or other fibers around an elastic and compressible core 4 made from an elastomer foam. This technique has the advantage of firstly allowing the continuous preparation of braiding of casings on textile machines and secondly easy introduction into the dies of the moulds. On the other hand, resin needs to be injected into said moulds, this being a delicate operation which requires expensive moulds. Moreover, the threads of dry fibers are twisted during braiding so that when they are plated against the mould when the resin is polymerized, they tend to create small spaces providing the moulded product obtained with a poor surface appearance.

It is also known that the continuous braiding machines do not make it possible vary at will the braiding angles of a given layer. This is a serious drawback when, for example, a flexible tubular element for subsequently forming the frame of a tennis racket is to be embodied. In fact, it is known that all the points of a frame are not stressed in the same way: some are more deflected than twisted or inversely. Furthermore, with this method, it is not possible to vary the number of fiber layers according to the locations of the tubular element. Another drawback is that the foam compressible core around which the braids are formed does not allow high pressures to be obtained so as to plate the fibers onto the walls of the mould, thus limiting the quality of the composite material finally obtained following polymerization. Finally, it is clear that only a single steady colour pigmenting the resin is used for tinting the unit of the braided complex. FIG. 2 shows the second conventional preparation method by rolling laps and fabrics of fibers previously impregnated with thermosetting resin around an inflatable sheath 8, made of cellophane for example, previously introduced around a rigid mandrel 9 facilitating rolling. The layers 5, 6, and 7, previously cut, are disposed flat according to various orientations and then rolled one after the other so that they am superimposed around the cellophane sheath 8.

Once the rigid mandrel is removed, the composite tubular element is introduced into the cavities of a mould. Then, high pressure is injected, for example air under 15 kg/cm$^2$, which causes the tubular element to be plated on the walls of the mould and then heated to polymerize the resin. As described in the U.S. Pat. No. 4,470,020, a foaming mixture may also be introduced during polymerization.

This second method also has some drawbacks. In fact, it is difficult to firstly exactly cut the strip of fabric or lap to be wound so that the vertical edges of the latter are strictly plumb in relation to each other. In fact, the external edge is made to slightly overlap the internal edge. Consequently, the mechanical properties of the element obtained are not isotropic around the axis of the latter. Along the generating line on which said vertical edges of the fabric strip or layer overlap, the tubular exhibits greater rigidity. Moreover, the superimposed layers of fabric, when the resin impregnating them is polymerized, tend to delaminate under repeated forces and bendings. When the casing is introduced into the cavity of the mould, it is known that the superimposed films of laps and fabrics naturally tend to unwind, which makes it impossible to obtain products with a strictly constant quality.

Also, when the tubular element is introduced into the cavity, folds form inside the bending radius whereas the laps are stretched externally. As a result, there is less resistance of the final polymerized tubular element. It is also clear that is impossible to vary the angles of the fibers comprising the films of the deposited laps at all the tubular element points. Finally, it appears difficult to give the tubular element obtained a polychromic aspect as the laps used are made of uniformly black fibers if carbon is used, or monochrome if another fiber is used.

Figure 3:
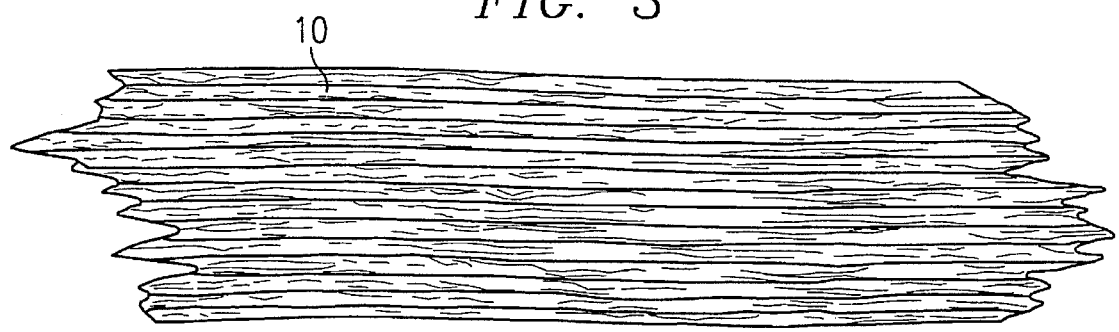

FIG. 3 shows one portion of the lap portion of unidirectional carbon fibers 10 obtained according to a known method. These fibers, which are impregnated with resin, are disposed next to each other so as to form a lap to be cut and crossworked manually by superimposition so as to form a multilayer composite unit which could subsequently be wound around a sheath to form the unit according to FIG. 2. This stratification of impregnated fibers is obtained manually and is therefore expensive and the angles of the superimposed layers are constant at such a point that the anisotrophy of the unit is constant at all points. Finally, it is obvious that said composite unit is monochrome. Also, it is worth mentioning that experience shows that resistance to delamination of the superimposed layers is poor.

The purpose of the present invention is to overcome the drawbacks of the abovementioned known methods.

The invention offers a method which consists of winding, by superimposed layers whose number may vary, impregnated reinforcing fibers of glass, carbon, aramide or any other fibers impregnated with thermosetting synthetic resin around a flexible sheath which covers a rigid mandrel which may be conical, cylindrical or have any other shape able to be subsequently removed after the filamentary winding operation carried out on an automatic machine. If desired, the synthetic resins used may be tinted in different colours.

According to the invention, the inflatable tubular element may be embodied either from a cylindrical sheath which may be thermoretractable, or from a tape wound helically around a mandrel so that the spires overlap over one portion of their width and thus form an inflatable seal sheath, the overlapping zones being rendered integral with each other.

This method makes it possible to place along variable angles various fibers preimpregnated with resins tinted in various colours. As the complex formed of interlaced fibers impregnated with multicoloured resins is separated from its rigid mandrel, it may be either cut off so as to obtain a lap laid flat or be introduced into the cavity of a mould.

In the latter case, air or a neutral gas is then introduced under high pressure into the inflatable hose by plating the impregnated fibers onto the sides of the mould and then heated so as polymerize the pre-impregnated resin.

It shall be observed that the method of the invention makes it possible to vary at will repetitively and cheaply the bending and/or resistance qualities on crushing of the tubular element or the rolled lap.

In fact, in this instance it is possible to determine the winding pitches, their number, length and superposition, the nature of the impregnated fibers and the forms of the mandrels. A strip of unidirectionnal fibers forming an undirectionally oriented strip of fibers may be placed along the generating line of the sheath thus providing this line with greater rigidity after the resin has solidified.

This method involving moulding of a tubular flexible fiber element wound around a flexible sheath is well known. Thus, the U.S. Pat. No. 3,902,944 and the Japanese patent No. 61-220 828 specify methods which are somewhat similar since they make it possible to embody fibrous and hollow structures coated with resin. However,* these documents do not mention the essential possibilities for embodying a multicoloured tubular element or a multicoloured lap whose anisotrophies can be controlled.

Figure 7:
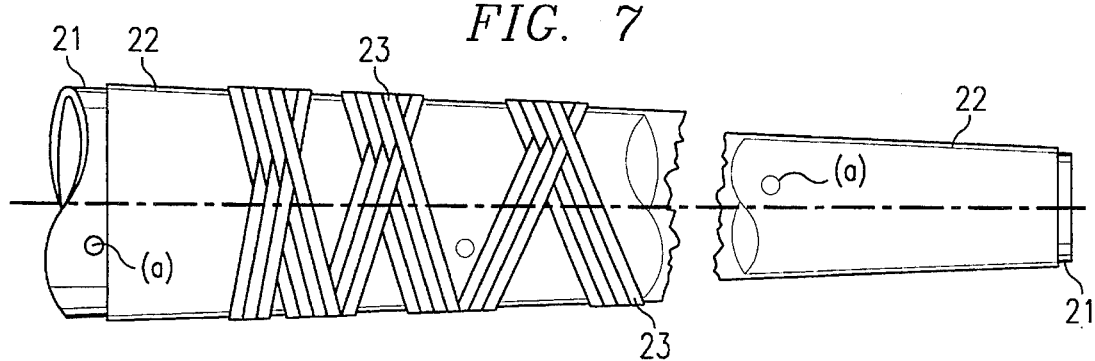
Figure 8:
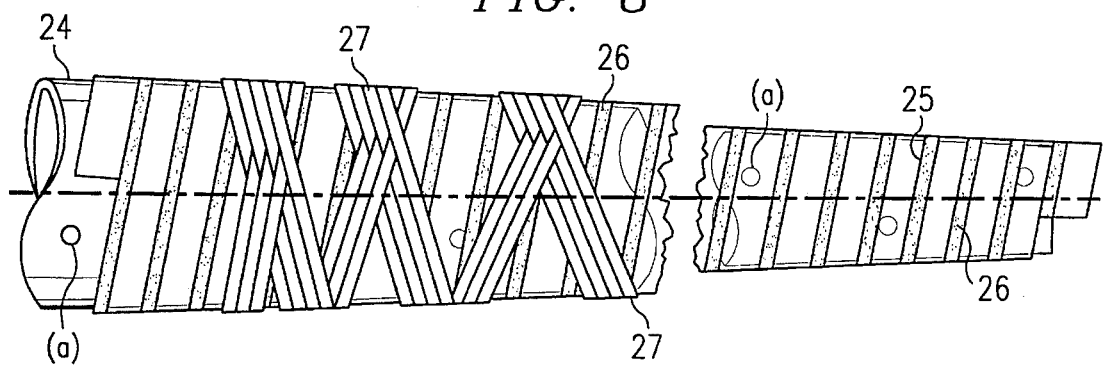
Figure 9:
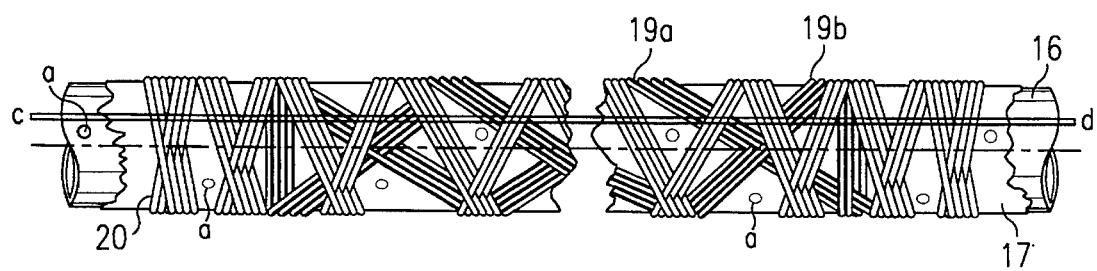
Figure 10:
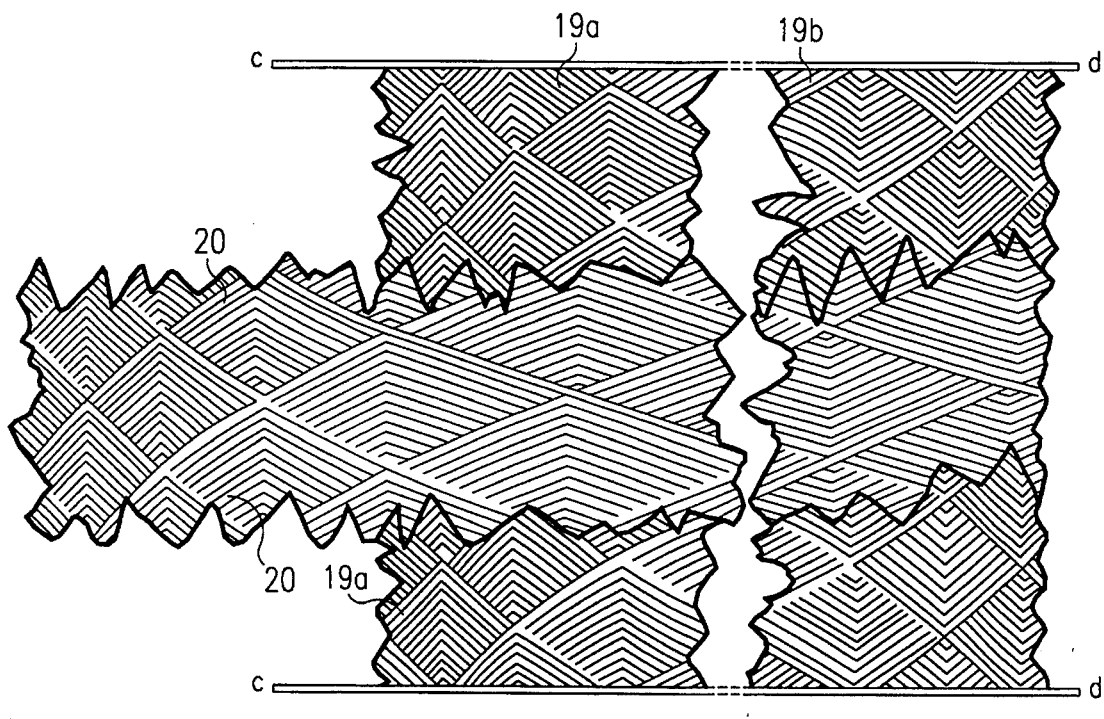
Figure 11:
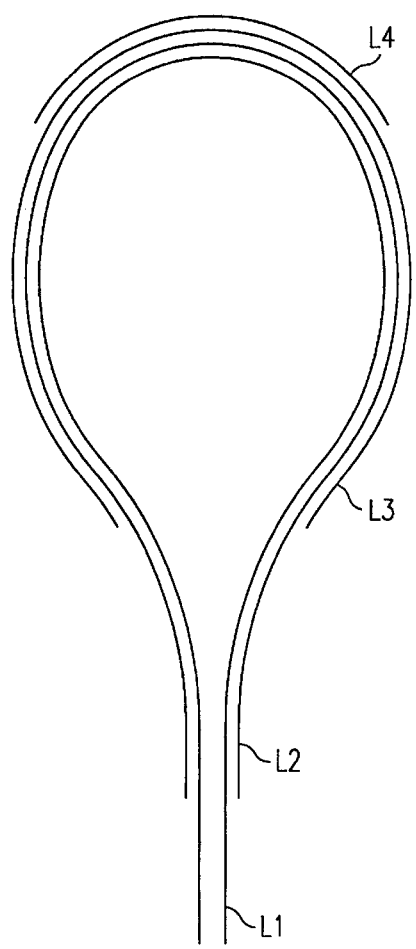
Figure 12:
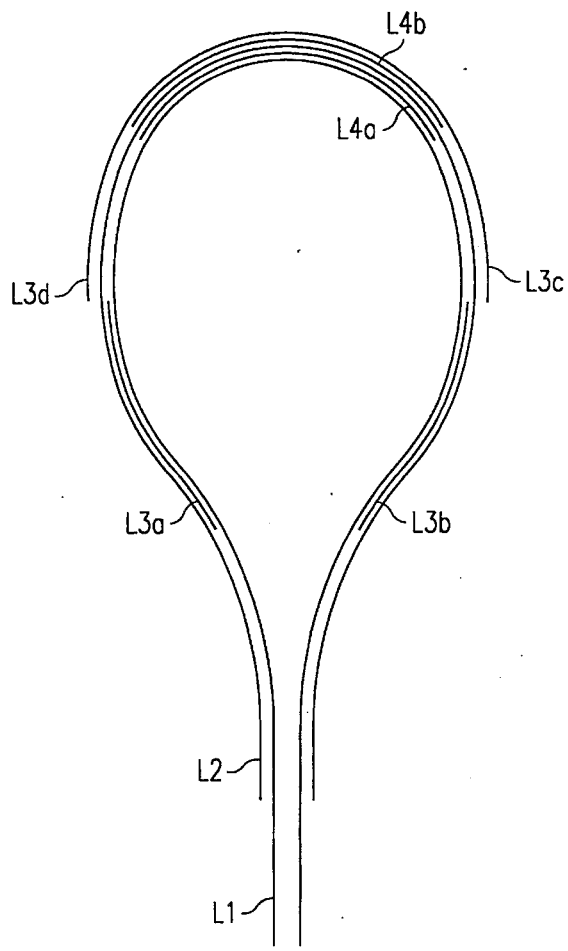
Figure 13:
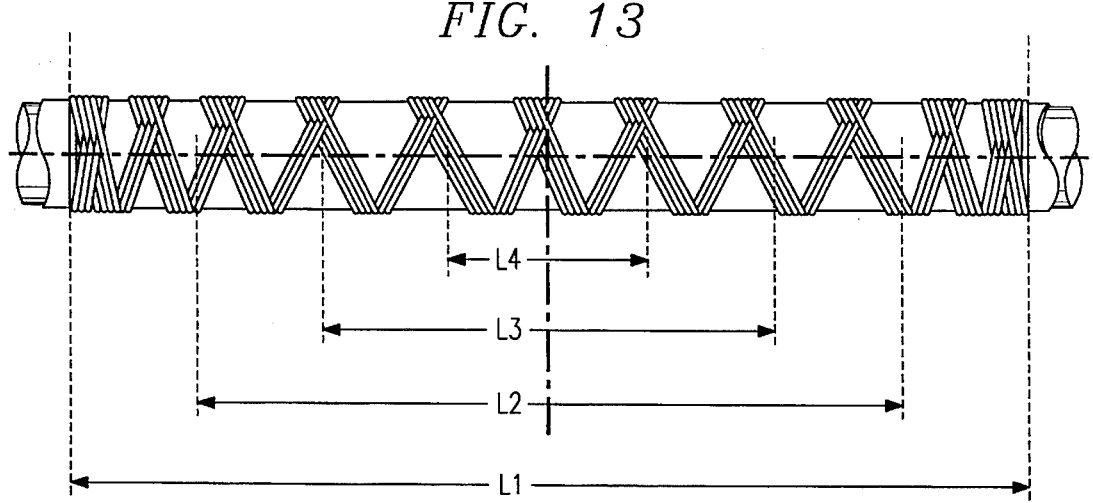

In fact, said documents do not mention those characteristics concerning winding according to a variable pitch on the different length of several layers of impregnated fibers, the shape of the mandrels, the nature of the flexible sheaths made of small strips or a thermoretractable material, the possibilities of inserting unidirectional fibers strips during winding, of forming multicoloured checkered patterns by tinting the resins prior to winding. The above-mentioned objectives and advantages of the invention, as well as other advantages, shall be readily understood on reading the following description given by way of non-restrictive example with reference to the accompanying drawings in which: FIGS. 1 to 3 shown known currently used methods of manufacture;

FIGS. 4 to 8 show a diagrammatical view of various embodiments of the method for preparing a flexible tubular element according to the invention, and FIGS. 9 and 10 show a diagrammatical view of embodiments of laps woven according to the invention, FIG. 11 shows very diagrammaticaly an example of a tubular flexible fibers element obtained according to the invention by successive windings in order to realise a tennis racket frame;

FIG. 12 is a view similar to FIG. 11 showing another example of tubular flexible fibers element obtained according to the invention to realise a tennis racket frame, and FIG. 13 is a flat view of the FIG. 11 flexible fibers element.

Figure 4:
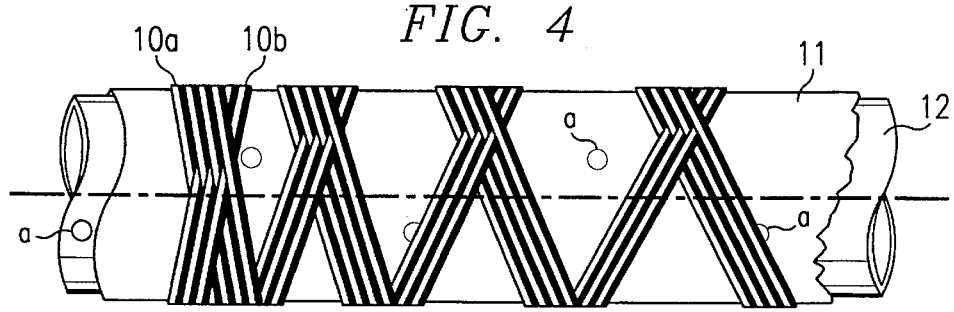

With reference to FIG. 4, two juxtaposed impregnated fibers different colours are wound, the first 10a being made of black carbon impregnated with resin, the second 10b being made of glass fiber whose impregnated resin is tinted in red making fibers red. This first winding is embodied around a sealed inflatable cellophane hose 11 first introduced onto a hollow driving mandrel 12 and to be subsequently removed after several layers of fibers 10a and 10b have been wound and superimposed.

To facilitate the operation for uncovering the hollow mandrel 12, the latter is perforated with holes allowing air under pressure to pass releasing the inflatable casing plated by the pressure of the wound threads 10a and 10b.

Figure 5:
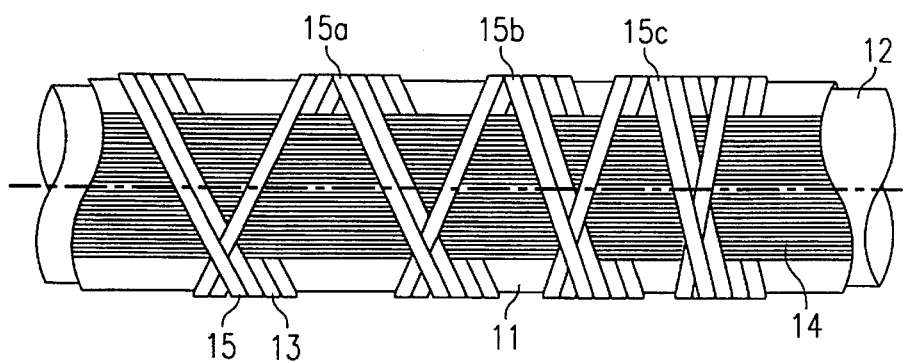

With reference to FIG. 5, it can be seen that on the tubular element being prepared, the fibers 15 are placed at 15a, 15b and 15c according to the various angles obtained by solely varying the rotational speed of the driving hollow mandrel 12, whereas the presentation of the fibers along the mandrel is effected at constant speed.

This figure also shows unidirectional fibers 14, made of carbon for example, which have been placed after the winding up operation has stopped, and which are clamped onto the cellophane sheath between the fibers 13 and the fibers 15 wound after the winding has stopped. The unidirectional fibers 14 are thus kept in place along the complex and, after polymerization, shall have specific mechanical characteristics.

Figure 6:
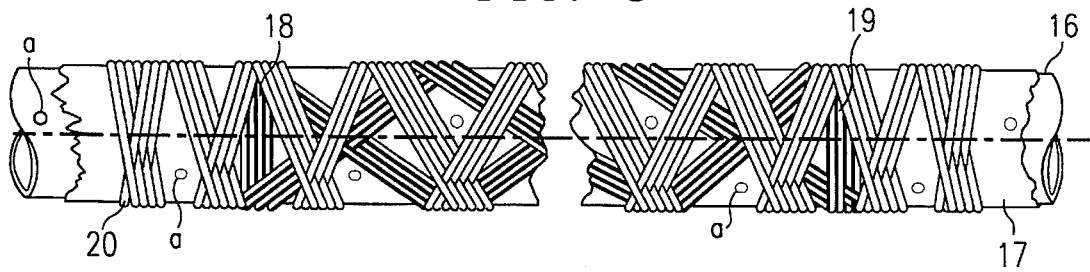

FIG. 6 shows a preferred embodiment variant having the largest number of advantages of the method of the invention. Thus, after the hollow mandrel 16 is covered and perforated with holes "a" intended to be used to uncover the composite tubular element from a resistant flexible sheath 17 made of cellophane or polypropylene for example, two juxtaposed fibers 18, one of which being made of carbon and the other tinted glass, are wound around the mandrel 16.

The fibers 18 are wound onto one central portion of the complex during four to-and-fro passages.

The rotational speed of the mandrel 16 has varied so that the angles at which the fibers 18 are deposited with respect to the axis of the mandrel 16 are different, as specified on FIG. 4.

It is thus observed that the fibers 18 and 19, respectively wound at the beginning and end of the passage perpendicular to the mandrel axis, strongly press the sheath 17 onto the mandrel 16. The uncovering operation of the composite tubular element before the latter is introduced into the polymerization mould once the winding operation has been completed shall be rendered easier by introducing air under pressure inside the hollow mandrel 16 which shall release said tubular element the level of the holes a.

When being superimposed on the winding of the fibers 18, fibers 20 are wound all along the sheath so as to finish the composite tubular element. It can be seen that in this instance the mechanical characteristics at the extremities of the tubular element differ from those at its centre.

This disposition of fibers superimposed at certain locations of the tubular element and moreover according to different angles, is particularly advantageous, for example in manufacturing a tennis racket, so as to vary the resistance according to the zones as all the points of the racket frame are not stressed by comparable forces.

Thus to produce tennis rackets of which mechanical, weight, aspect and prices characteristics will cover as a whole the users' wishes, one may advantageously use the process according to the following examples:

EXAMPLE 1

In view to manufacturing a light and very stiff tennis racket, carbon fibers are impregnated with epoxyde resin so that 38% of the total weight carbon fibers epoxyde resin is made of resin, then a 200 g tubular flexible fibrous element is realised before being moulded to produce a tennis racket frame. These 200 grammes include the weight of terminal windings which are wound perpendicularly to the axis to prevent impregnated fibers from sliding along the sheath. These terminal windings which are situated at the extremity of the racket handle will be trimmed after moulding.

A tubular flexible element is obtained in winding around a mandrel the said impregnated fibers over an inflatable polyamide 6.6 type sheath having a 60 micron thickness, weighing 4,5 g/m with a 19 mm diameter and a 1650 mm length. To that end, as represented on FIGS. 11 and 13, a first winding under a 25° angle with relation to the mandrel axis is made so that 130 g of impregnated fibers are laid over the $L_1$ length of the sheath that is to say 65% of the total 200 g weight of the tubular element to be obtained. Then, over the first winding, under a 22° angle with relation to the mandrel axis, over a $L_2$ length equal to 80% of $L_1$, that is to say 1320 mm, and spread over symetrically to the middle of the $L_1$ length, a second winding is laid until reaching 30 g that is to say 15% of the total 200 g weight. Then over the second winding, under a 27° angle over a $L_3$ length equal to 910 mm corresponding to 55% of $L_1$, a third winding is wrapped until it reaches 34 g that is to say 17% of the total 200 g weight.

Then over this third winding, under a 22° angle, over a 300 mm $L_4$ length equal to 18% of $L_1$, is laid a fourth winding weighing 6 g corresponding to 3% of the total weight.

Finally, after injecting air into the inflatable sheath, the tubular flexible element is separated from the mandrel.

On the following synoptic table the caracteristics of each successive layer of continuously wound carbon-resin filaments forming the flexible tubular element are presented.

TABLE NO. 1

| Layers | Length of layers (mm) | Angles of fibers layer | Weight of fibers layers | |
|---|---|---|---|---|
| | | | g | % of the total |
| $L_1$ | 1650 = $L_1$ | 25° | 130 | 65% |
| $L_2$ | 1310 = $L_1$ × 80% | 22° | 30 | 15% |
| $L_3$ | 910 = $L_1$ × 55% | 27° | 34 | 17% |
| $L_4$ | 300 = $L_1$ × 18% | 22° | 6 | 3% |
| | | | 200 | 100% |

EXAMPLE 2

To realise a less rigid but heavier tennis racket frame (250 g weight including weigh of the terminal windings as seen in example No. 1) the flexible tubular element is made from simultaneously wound impregnated carbon fibers with glass fibers also embedded in an epoxy resin. These glass fibers are tinted with green colour to endow the racket with an original cosmetic to that end, as represented on FIG. 12, over an inflatable sheath comparable to the sheath used in example 1 but having a 1620 mm length, a first carbon-glass-resin winding is wound over the total $L_1$ length with a starting 27° angle regularly varying to reach 18° in the middle of the sheath and coming back to 27° when reaching the second end of the inflatable sheath. This first winding of impregnated fibers weighs 150 g corresponding to 60% of the total 250 g.

Then a second winding of the same carbon-glass-resin composite is realised under a 36° over a 940 mm=$L_3$ length corresponding to 58% of the $L_1$ length until reaching 45 g that is to say 18% of the total 250 g weight.

As shown on FIG. 12, this second winding is made of two symmetric parts, $L_{3a}$ and $L_{3b}$, directly wound over the first winding and of a central $L_{3c}$ part which, as described further, will be wound around the external $L_{4b}$ part belonging to a third winding of fibers. Then over the first $L_1$ central part winding an inside part $L_{4a}$ of the third winding such as $L_{4a}+L_{4b}=L_4$ is wound under a 24° angle over a 535 mm length (33% of $L_1$) weighing 10 grammes that is to say 4% of the total 250 grammes weight.

Then a fourth winding always of the same composit is performed, under a 24° angle, over a 1361 mm length (24% of $L_1$) weighing 45 grammes that is to say 18% of the total weight.

Over this fourth winding the $L_{4b}$ complementary third $L_{4a}$ winding part is wound, then over this last one the complementary $L_{3c}$ part to the second $L_{3a}$ and $L_{3b}$ parts of the second winding is performed.

The following table sums up the weights, lengths, angles repartitions of the various windings.

TABLE NO. 2

| Layers | Length of layers (mm) | Angles of fibers layers | Weight of fibers layers | |
|---|---|---|---|---|
| | | | g | % of the total |
| $L_1$ | 1620 = $L_1$ | 18° to 27° | 150 | 60% |
| $L_2$ | 1361 = $L_1$ × 84% | 24° | 45 | 18% |
| $L_{3a} + L_{3b} + L_{3c} + L_{3d}$ | 940 = $L_1$ × 58% | 36° | 45 | 18% |
| $L_{4a} + L_{4b}$ | 535 = $L_1$ × 33% | 23° | 10 | 4% |
| | | | 250 | 100% |

In this last example it is clear that the various windings forming the different layers are interwoven. Similar experiences have been performed on very numerous examples so that it has been demonstrated that to realise a tennis racket frame of good quality made of impregnated composite fibers it was enough to realise a plurality of fibers windings weighing between 150 grammes and 250 grammes under angles contained between 18° and 42° with relation to the longitudinal axis of the mandrel, these windings having weights and covering the lengthes indicated in the following table no. 3:

TABLE NO. 3

| Layers | Length of layers | Coefficients a, b, c/$L_1$ | Percentage of the total P weight of impregnated fibers |
|---|---|---|---|
| $L_1$ | $L_1$ | | 58% to 70% |
| $L_2$ | $L_2 = L_1 \times a$ | 72% ≦ a ≦ 85% | 12% to 26% |
| $L_3$ | $L_3 = L_1 \times b$ | 50% ≦ b ≦ 62% | 8% to 20% |
| $L_4$ | $L_4 = L_1 \times c$ | 16% ≦ c ≦ 33% | 2% to 8% |

FIG. 7 shows a conical mandrel 21 onto which a thermosetting flexible-material sheath 22 is threaded which, having been heated at its own retraction temperature by a hot-air current passage, has adopted the shape of the conical mandrel 21. Fiber 23 impregnated with thermosetting synthetic resin are then wound around the sheath 22. Advantageously, a crosslinked polyolefine sheath belonging to the polyethylene family whose necking ratio is currently from 2 to 1 when heated to 90° C., but from 130° C. to 250° C. it regains its elasticity required for inflation and polymerization of the coating resin coating the fibers 23. In the case where ceramic fibers coated in resins polymerizing at high temperatures are used, polytetrafluorethylene sheaths whose necking temperature is 327° C. could be used so as to enable said sheaths to regain their elasticity at roughly higher temperatures (520° C.).

To facilitate the operation for uncovering the composite tubular element of the hollow mandrel 21, air under pressure may again advantageously be introduced and which will release the tubular element by coming out through the holes a.

FIG. 8 shows a conical mandrel 24 on which windings into hellical spires 25 are carried out, partly overlapping at 26 a soft and flexible plastic material and then fibers 27 impregnated with thermosetting synthetic resin. In order to obtain a airtight inflatable flexible hose, also resistant to temperatures greater than 100° C. from which the coating resins of fibers start to harden, it is preferable to use a 50 micron thick polypropylene tape with a cast film quality and whose elasticity is good and whose zones 26 for overlapping the spires 25 on the rotating mandrel 24 are welded, for example, by the passage of hot whirls heated at 180° C., also providing a pressure of 4 kg/cm² for 1.5 to 2 seconds.

The conical hose thus obtained could be coated with for example reinforcing fibers coated with epoxide or polyester resins whose polymerization temperatures could reach up to 170° C.

If on the other hand, resins polymerizing at lower temperatures are used so as to embody the conical hose, it is possible to wind a polyacid tape neutralized by inorganic salts, one characteristic of the strip being extensible and quickly weldable since its fusion point is 95° C.

Equally, the covering zones 26 of spires 25 may be glued by scanning them before they are covered with a whirl or a coating brush covered with a suitable adhesive.

It is also clear that rendering integral the covering zones 26 os spires 25 of the composite fiber can be carried out solely by air pressure or a swelling foam.

To facilitate uncovering of the composite tubular element the hollow mandrel 24, air under pressure can advantageously be introduced, said air coming to release the tubular element by coming out via the holes a.

FIG. 9 is comparable to FIG. 6, but instead of separating the mandrel 16 from its tubular element the latter is cut along the axis CD, namely a generating line of the cylindric mandrel, so as to obtain a lap.

The fibers 19a and 19b are of different colours. The fibers 20 of the second winding differ from the fibers 19a and 19b.

FIG. 10 shows a unpeeled portion of the lap laid flat. It is clear that the mechanical characteristics at various points of the lap differ since the number, nature and angle for placing the tufts 19a, 19b and 20 vary. Similarly, if the mandrel 16 were cone-shaped, the characteristics of the lap would still be different, everthing else relating to the fibers being similar.

If the mandrel were oblong, the characteristics of the lap would also be different.

What I claim is:

1. A method for embodying for subsequent moulding operation a tubular flexible element impregnated with resin, for realizing a tennis racket frame, which comprises the following steps:

(a) impregnating reinforcing fibers with resin;

(b) winding said impregnated reinforcing fibers around a tubular flexible sheath placed onto a rigid rotary-driven mandrel having a longitudinal axis, so that at least one additional winding of said reinforcing fibers is wound over a different length and according to a pitch which varies during winding operation of the additional winding, to obtain a tubular flexible element to be molded of which anisotrophy is controlled;

said tubular flexible element having a length comprised between 1200 and 1800 mm;

the impregnated reinforcing fibers winding laid over the flexible sheath having a total weight comprised between 150 and 250 g.; and the impregnated fibers winding being laid over with angles contained between 18 degrees and 42 degrees with relation to the mandrel longitudinal axis;

said impregnated fibers winding comprising;

a first winding performed over a first length of the tubular flexible element and having a weight contained between 58% and 70% of the total weight;

a second winding performed over a second length, symmetrical to a middle of the first length of the tubular flexible element, comprised between 72% and 85% of the first length, the said second winding having a weight comprised between 12% and 26% of the total weight;

a third winding performed over a third length, symmetrical to the middle of the first length of the tubular flexible element, contained between 50and 62% of the first length, the said third winding having a weight comprised between 8% to 20% of the total weight;

and a fourth winding performed over a fourth length, symmetrical to the middle of the first length of the tubular flexible element, comprised between 16% and 33% of the first length, the said fourth winding having a weight comprised between 2% and 8% of the total weight; and (c) separating said tubular flexible element from the mandrel and performing molding thereof.

2. Method according to claim 1 wherein at least one of said winding is divided into several parts which are differently interwoven between other windings.

3. Method according to claim 1 wherein prior to winding the impregnated reinforcing fibers, the latter are coated with resins tinted in different colors giving the obtained tubular flexible element a woven multicolored appearance.

4. Method according to claim 1 wherein the winding is stopped to place a strip of contiguous fibers oriented along a generating line of said flexible sheath, then the winding starting again so that said strip is clamped between two windings of the impregnated reinforcing fibers, thus forming a punctual reinforcement of the tubular flexible element.

5. Method according to claim 1 wherein the impregnated reinforcing fibers forming the additional winding are of a different nature, thus giving the tubular flexible element obtained special mechanical characteristics.

\* \* \* \* \*